(12) United States Patent
Nachum

(10) Patent No.: US 9,967,150 B2
(45) Date of Patent: May 8, 2018

(54) METHODS AND APPARATUSES FOR IMPLEMENTING NETWORK VISIBILITY INFRASTRUCTURE

(71) Applicant: Ixia, Calabasas, CA (US)

(72) Inventor: Youval Nachum, Santa Clara, CA (US)

(73) Assignee: KEYSIGHT TECHNOLOGIES SINGAPORE (HOLDINGS) PTE. LTD., Singapore (SG)

(*) Notice: Subject to any disclaimer, the term of this patent is extended or adjusted under 35 U.S.C. 154(b) by 44 days.

(21) Appl. No.: 14/266,668

(22) Filed: Apr. 30, 2014

(65) Prior Publication Data

US 2015/0319049 A1    Nov. 5, 2015

(51) Int. Cl.
| | |
|---|---|
| H04W 24/00 | (2009.01) |
| H04L 12/24 | (2006.01) |
| H04L 12/26 | (2006.01) |
| H04L 29/06 | (2006.01) |

(52) U.S. Cl.
CPC .............. *H04L 41/14* (2013.01); *H04L 43/04* (2013.01); *H04L 63/1408* (2013.01)

(58) Field of Classification Search
None
See application file for complete search history.

(56) References Cited

U.S. PATENT DOCUMENTS

| | | |
|---|---|---|
| 5,343,473 A | 8/1994 | Cidon et al. |
| 5,867,763 A | 2/1999 | Dean et al. |
| 6,130,887 A | 10/2000 | Dutta |
| 6,505,255 B1 | 1/2003 | Akatsu et al. |
| 6,678,250 B1 | 1/2004 | Grabelsky et al. |
| 6,814,510 B1 | 11/2004 | Sabbagh et al. |
| 6,907,001 B1 | 6/2005 | Nakayama et al. |
| 7,286,652 B1 | 10/2007 | Azriel et al. |
| 7,424,018 B2 | 9/2008 | Gallatin et al. |
| 7,515,650 B1 | 4/2009 | Warner et al. |
| 7,596,356 B2 | 9/2009 | Rofougaran et al. |
| 7,873,702 B2 | 1/2011 | Shen et al. |
| 7,945,216 B2 | 5/2011 | Rakshani et al. |
| 8,098,677 B1 | 1/2012 | Pleshek et al. |
| 8,102,783 B1 | 1/2012 | Narayanaswamy et al. |

(Continued)

FOREIGN PATENT DOCUMENTS

WO    WO 2011/133711 A2    10/2011

OTHER PUBLICATIONS

Open Networking Foundation, OpenFlow Switch Specification Oct. 12, 2013, OpenFlow, Version 1.4.0, p. 1-34.*

(Continued)

*Primary Examiner* — Hassan Phillips
*Assistant Examiner* — Ayanah George

(57) ABSTRACT

A visibility infrastructure network or monitoring a switching network is disclosed. There are included a plurality of network infrastructure visibility elements implementing forwarding hardware for forwarding packets to monitoring tools. There is also included an abstracted operating system shared by said plurality of network infrastructure visibility elements. There are further included at least one application executing on said abstracted operating system and a common logical architecture having common protocols for enabling the plurality of network infrastructure visibility elements and the applications to communicate with the abstracted operating system.

16 Claims, 5 Drawing Sheets

(56) References Cited

U.S. PATENT DOCUMENTS

| | | | |
|---|---|---|---|
| 8,134,927 | B2 | 3/2012 | Gamage et al. |
| 8,248,928 | B1* | 8/2012 | Wang .................... H04L 43/026 370/230 |
| 8,306,063 | B2 | 11/2012 | Erdal et al. |
| 8,386,937 | B1 | 2/2013 | Gao et al. |
| 8,446,916 | B2 | 5/2013 | Aybay et al. |
| 9,270,542 | B2 | 2/2016 | Gamage et al. |
| 9,571,296 | B2 | 2/2017 | Nachum |
| 9,806,968 | B2 | 10/2017 | Matityahu et al. |
| 2002/0073136 | A1 | 6/2002 | Itoh et al. |
| 2003/0144868 | A1 | 7/2003 | MacIntyre et al. |
| 2003/0172123 | A1 | 9/2003 | Polan et al. |
| 2004/0015613 | A1 | 1/2004 | Ikeda |
| 2005/0282502 | A1 | 12/2005 | Kursula et al. |
| 2006/0174032 | A1 | 8/2006 | Winchester et al. |
| 2006/0223516 | A1 | 10/2006 | Fan et al. |
| 2006/0294221 | A1 | 12/2006 | Graupner et al. |
| 2007/0189272 | A1 | 8/2007 | Hutchinson et al. |
| 2008/0052784 | A1 | 2/2008 | Wiley et al. |
| 2008/0147831 | A1 | 6/2008 | Redjaian et al. |
| 2008/0153541 | A1 | 6/2008 | Rakshani et al. |
| 2008/0170561 | A1 | 7/2008 | Halbraich et al. |
| 2008/0190639 | A1 | 8/2008 | Baran et al. |
| 2008/0215477 | A1 | 9/2008 | Annunziata |
| 2009/0182874 | A1 | 7/2009 | Morford et al. |
| 2009/0190589 | A1 | 7/2009 | Bains et al. |
| 2010/0135164 | A1 | 6/2010 | Rofougaran |
| 2010/0228854 | A1 | 9/2010 | Morrison et al. |
| 2011/0026406 | A1 | 2/2011 | Gamage et al. |
| 2011/0026521 | A1 | 2/2011 | Gamage et al. |
| 2011/0103259 | A1 | 5/2011 | Aybay et al. |
| 2011/0103595 | A1 | 5/2011 | Ramaswamy et al. |
| 2011/0264797 | A1 | 10/2011 | Matityahu et al. |
| 2012/0124257 | A1 | 5/2012 | Wu |
| 2012/0181540 | A1* | 7/2012 | Udagawa ............ H01L 27/3262 257/59 |
| 2012/0317224 | A1 | 12/2012 | Caldwell et al. |
| 2013/0010605 | A1* | 1/2013 | Jocha .................... H04L 43/026 370/241.1 |
| 2013/0272135 | A1* | 10/2013 | Leong ................. H04L 41/0823 370/241 |
| 2013/0336240 | A1 | 12/2013 | Cherian et al. |
| 2014/0012962 | A1 | 1/2014 | Formby et al. |
| 2014/0181267 | A1* | 6/2014 | Wadkins ............... H04L 69/163 709/219 |
| 2015/0009994 | A1* | 1/2015 | Keesara .................. H04L 45/12 370/392 |
| 2015/0029846 | A1* | 1/2015 | Liou ..................... H04L 47/122 370/230.1 |
| 2015/0055720 | A1 | 2/2015 | Lin et al. |
| 2015/0113133 | A1 | 4/2015 | Srinivas et al. |
| 2015/0113143 | A1* | 4/2015 | Stuart ................... H04L 41/145 709/226 |
| 2015/0319070 | A1 | 11/2015 | Nachum |
| 2016/0057039 | A1* | 2/2016 | Htay ................... H04L 43/0876 709/224 |
| 2016/0226752 | A1 | 8/2016 | Gamage et al. |

OTHER PUBLICATIONS

Open Networking Foundation, OpenFlow Switch Specification Oct. 12, 2013 OpenFlow, Version 1.4.0 p. 1-34.*

Non-Final Office Action for U.S. Appl. No. 13/092,671 (dated Jun. 2, 2016).

Extended European Search Report for European Patent Application No. 11772665.3 (dated Oct. 1, 2015).

Final Office Action for U.S. Appl. No. 13/092,671 (dated Nov. 6, 2014).

Non-Final Office Action of U.S. Appl. No. 13/092,671 (dated Apr. 23, 2014).

Final Office Action for U.S. Appl. No. 13/092,671 (dated May 23, 2013).

Non-Final Office Action for U.S. Appl. No. 13/092,671 (dated Nov. 9, 2012).

Notification of Transmittal of the International Search Report and the Written Opinion of the International Searching Authority, or the Declaration for International Application No. PCT/US2011/033313 (dated Nov. 30, 2011).

Final Office Action for U.S. Appl. No. 13/092,671 (dated Dec. 16, 2016).

Non-Final Office Action for U.S. Appl. No. 15/012,801 (dated Dec. 13, 2016).

Non-Final Office Action for U.S. Appl. No. 13/933,838 (dated Dec. 1, 2016).

Notice of Allowance and Fee(s) Due for U.S. Appl. No. 14/266,660 (dated Oct. 13, 2016).

Applicant-Initiated Interview Summary for U.S. Appl. No. 13/092,671 (dated Sep. 9, 2016).

Final Office Action for U.S. Appl. No. 13/933,838 (dated May 19, 2016).

Non-Final Office Action for U.S. Appl. No. 13/933,838 (dated Sep. 24, 2015).

Selecting the Right VERAstreamTM Product, DATACOM Systems INC, p. 1-1 (May 14, 2013).

Notice of Allowance and Examiner Initiated Interview Summary for U.S. Appl. No. 13/092,671 (dated Jul. 20, 2017).

Final Office Action for U.S. Appl. No. 13/933,838 (dated Jun. 22, 2017).

Final Office Action for U.S. Appl. No. 15/012,801 (dated Jun. 2, 2017).

Advisory Action and Examiner Initiated Interview Summary for U.S. Appl. No. 13/092,671 (dated Mar. 13, 2017).

Notice of Panel Decision from Pre-Appeal Brief Review for U.S. Appl. No. 15/012,801 (dated Oct. 25, 2017).

Commonly-assigned, co-pending U.S. Appl. No. 15/012,801 for "Apparatus and Methods for Forwarding Data Packets Captured From a Network," (Unpublished, filed Feb. 1, 2016).

Notice of Allowance for U.S. Appl. No. 14/266,660 (dated Jan. 21, 2016).

Non-Final Office Action for U.S. Appl. No. 14/266,660 (dated Sep. 18, 2015).

Notice of Allowance and Fee(s) Due and Examiner-Initiated Interview Summary for U.S. Appl. No. 12/533,957 (dated Aug. 7, 2015).

Non-Final Office Action for U.S. Appl. No. 12/533,957 (dated Nov. 17, 2014).

Final Office Action for U.S. Appl. No. 12/533,957 (dated Feb. 28, 2014).

Interview Summary for U.S. Appl. No. 12/533,957 (dated Jan. 24, 2014).

Non-Final Office Action for U.S. Appl. No. 12/533,957 (dated Sep. 12, 2013).

Final Office Action for U.S. Appl. No. 12/533,957 (dated Jan. 2, 2013).

Non-Final Office Action for U.S. Appl. No. 12/533,957 (dated May 11, 2012).

"Smart Taps Getting Smarter," Networking, Network Computing (Mar. 22, 2012). http://www.networkcomputing.com/networking/smart-taps-getting-smarter/1797861399.

"Command Today's Complex Data Center Challenges," Data Center, Net Optics Whitepapers, Net Optics Inc. (2011).

Notice of Allowance and Fee(s) Due for U.S. Appl. No. 12/533,951 (dated Nov. 8, 2011).

Final Office Action for U.S. Appl. No. 12/533,957 (dated Oct. 31, 2011).

Interview Summary for U.S. Appl. No. 12/533,957 (dated Aug. 31, 2011).

Non-Final Office Action for U.S. Appl. No. 12/533,957 (dated Aug. 2, 2011).

Interview Summary for U.S. Appl. No. 12/533,951 (dated Jul. 28, 2011).

Non-Final Office Action for U.S. Appl. No. 12/533,951 (dated Feb. 18, 2011).

Agilent Technologies, "Agilent N2X: The Industry's Most Comprehensive Multiservices Test Solution for Converging Network Infrastructures," 5989-1244EN, pp. 1-6 (Feb. 1, 2006).

(56) References Cited

OTHER PUBLICATIONS

Agilent Technologies, "Agilent N2X PITV Quality of Experience Test Solution," N5570A and E7877A Technical Data Sheet, 5989-3440EN, pp. 1-12 (Jul. 21, 2006).
Agilent Technologies, "True Router Performance Testing: Agilent Technologies Router Tester Application Note," 5980-1421E, Rev. A, pp. 1-8 (May 2000).
Letter from Ixia to Agilent Technologies re: Notice of Indemnification Claims/Dispute pp. 1-2 (Nov. 9, 2010).
Letter from Agilent Technologies to Ixia re: Notice of Indemnification Claims/Dispute, pp. 1-2 (Oct. 28, 2010).
Letter from Ixia to Agilent Technologies re Notice of Erroneously Assigned Patent Applications and Request for Executed Assignment, pp. 1-2 (Oct. 22, 2010).
Letter from Agilent Technologies to Ixia re: Notice of Erroneously Assigned Patent Application and Request for Executed Assignment, pp. 1-2 (Oct. 8, 2010).
"Radware's Smart IDS Management, FireProof and Instrussion Detection System, Deployment and ROI," Radware, Inc. pp. 1-9 (Aug. 21, 2002).
Edwards, "Vulnerabilities of Network Intrusion Detection Systems: Realizing and Overcoming the Risks, the Case for Flow Mirroring," Top Layer Networks, pp. 1-18 (May 1, 2002).
Notice of Allowance for U.S. Appl. No. 14/266,660 (dated May 13, 2016).
Examiner's Answer for U.S. Appl. No. 15/012,801 (dated Mar. 27, 2018).

\* cited by examiner

METHODS AND APPARATUSES FOR IMPLEMENTING NETWORK VISIBILITY INFRASTRUCTURE

BACKGROUND OF THE INVENTION

The present invention relates to methods and apparatuses for improving network visibility in a network environment. More particularly, the present invention relates, in one or more embodiments, to improvements in configuring and managing network visibility infrastructures in a network environment.

A network is typically formed of, among others, a large number of switching resources (such as for example routers and switches) and links. Data, in the form of packets for example, may be sent through the links of the network. By configuring the switches appropriately, data packets may be sent from a given sender coupled to the network to a given receiver also coupled to the network although the sender and the receiver may be physically located far apart. The speed with which data packets are transferred from the sender to the receiver depends, in part, on the capacity and speed of the links as well as on the switching resources. The internet is an example of such a network and is well known, and thus its basic operating principles will not be discussed in great details herein.

Network Packet Brokers ("NPB"), network taps ("taps"), and mirroring ports on switching resources have long been incorporated into networks (such as internal networks and/or the internet) to facilitate processing of data packets and/or to route data packets to/from network monitoring tools. These monitoring tools may include, for example, network analysis tools, forensic tools, various network monitoring tools, firewalls, malware prevention tools, intrusion detection tools, etc.

Generally speaking, taps are implemented at specific points in the network to access the data traffic and pass the data (whether the original data packets or the replicated copies thereof) to the monitoring tools. NPBs, on the other hand, represent hardware and/or software modules that perform, among other tasks, aggregation of monitored traffic (which again can be the original data packets or replicated copies thereof) from multiple links/segments, filtering and grooming of traffic to relieve overburdened monitoring tools, load-balancing traffic across a pool of monitoring tools, and regeneration of traffic to multiple monitoring tools. Both taps and NPBs are available from vendors such as Ixia of Calabasas, Calif.

Mirroring ports are ports implemented on the switching resources and are configured to send replicated data packets that traverse the switching resources (which may be all traversing packets or a filtered set thereof).

To facilitate discussion, FIG. 1A shows the relationship between the production network 10, the network visibility infrastructure 20, and the network monitoring tools 30.

Production network 10 represents the network of switching resources and links that is configured to transport data between the sender and the receiver. Network monitoring tools 30 perform functions that are not directly related to the transport of packets through production network 10 but are nevertheless necessary to ensure optimum performance of production network 10. These network monitoring functions include for example security, application performance monitoring (APM), network performance monitor (NPM), malware detection, intrusion detection, as well as other network management tasks. The list above is not inclusive, and these network monitoring functions are known to those skilled in the art.

Network visibility infrastructure comprises for example the taps, the network packet brokers, and the mirroring ports (e.g., SPAN™ ports from Cisco Systems of San Jose, Calif.) that are disposed at various nodes in production network 10 to obtain data packets or copies thereof for use by network monitoring tools 30.

FIG. 1B shows a typical network configuration in which a plurality of network devices (such as routers or switches) 102A, 102B, 102C, 102D, 102E, 102F and 102G are shown communicatively coupled to NPB 104. These network devices represent some of the switching resources that direct traffic from one user to another via the network.

The couplings between network devices 102A-102C with NPB 104 are accomplished using respective mirroring ports 106A-106C (such as a SPAN or Switch Port Analyzer ports in the terminology of vendor Cisco Systems of San Jose, Calif.) on the network devices. Data packets traversing each of NDs 102A-102C may be replicated and provided to respective mirroring ports, which packets are then provided on respective links 108A-108C to respective ingress ports (not shown) of NPB 104. In this configuration, NPB 104 is said to be connected in an out-of-band configuration with respect to packets traversing NDs 102A-102C since the original packets continue on their way without traversing NPB 104 while NPB 104 receives the replicated packets from NDs 102A-102C for forwarding to one or more of the monitoring tools 122 and 124.

Packets traversing between ND 102D and ND 102E can be tapped by tap 110, which is coupled to both NDs 102D and 102E. In one example, the packets from NDs 102D and 102E may be duplicated by tap 110 and provided to NPB 104 via links 108D and 108E respectively. In this configuration, NPB 104 is said to be connected in an out-of-band configuration with respect to packets traversing NDs 102D and 102E since the original packets continue on their way without traversing NPB 104 while NPB 104 receives the replicated packets from NDs 102D-102E.

In another example, the packets from ND 102D may be intercepted by tap 108 and redirected by tap 108 to NPB 104 and from NPB 104 to one or more of the monitoring tools for further forwarding to an analysis tool (such as analyzer 120) before being routed to ND 102E if the result of the analysis indicates that such routing is permissible. Malware detection may be one such type of analysis. In this configuration, NPB 104 is said to be connected in an in-line configuration since NPB 104 is in the data path between ND 102D and ND 102E and packets must traverse NPB 104 before reaching the destination.

FIG. 1B also shows a port aggregator 126, which aggregates packet traffic from NDs 102F and 102G to provide the aggregated packets to NPB 104 via link 124. Again, NPB 104 can be connected in-line with respect to the communication between NDs 102F and 102G (i.e., NPB 104 can be in the network data path), or NPB 104 can be connected in an out-of-band manner with respect to the communication between NDs 102F and 102G (i.e., NPB 104 receives only the replicated packets and the original packets continue on their way without traversing NPB 104).

Although only a few of the switching resources (e.g., network devices) are shown in FIG. 1B, it should be understood that a typical network may involve hundreds or thousands of these switching resources. Configuring and managing such a large number of switching resources are huge problems for network operators, and thus network operators have turned to technologies such as Software Defined Networks (SDNs) to ease the task of configuring and managing the switching resources.

Generally speaking, SDN decouples the switching hardware (e.g., the actual packet processors or network processors that perform the switching) from the control plane (implemented at least by the operating system and may include applications). Without decoupling, each network resource (such as a switch or a router) would have its own forwarding hardware controlled by its own applications executing on its own operating system. Any change in the configuration and management of the network or links thereof tends to involve reconfiguring a large number of associated switching resources using local applications executed on each of the switching resources.

SDN implements an abstracted operating system/control module and applications are executed on this abstracted operating system. The switching hardware circuitry and some control logic (e.g., packet processors or network processors) are implemented locally at each of the switching resources. The applications/abstracted operating system communicate with the switching hardware at each of the switching resources via well-established standard, such as OpenFlow™ (Open Software Foundation (ONF), https://www.opennetworking.org).

In SDN, if a change needs to be made to an application and/or to the operating system, it is no longer necessary to make the change on each of the switching resources. Instead, the change can be made at the centralized applications and/or the abstracted operating system, thereby simplifying configuration and/or maintenance. To put it differently, SDN permits the network operator to configure and manage the switching resources of the network from a centralized location using a software-centric paradigm.

Although taps, network packet brokers, and mirroring ports are also disposed throughout the network, these network visibility resources are not considered switching resources and thus far, there has been no way to manage the network visibility infrastructures as an integrated network. There is, however, a need to also reduce the configuration and/or maintenance burden associated with implementing a large number of these network visibility resources over vast distances as well as to better integrate network visibility into network traffic management and routing. Addressing these needs is one among many goals of embodiments of the present invention.

SUMMARY OF SOME EMBODIMENTS OF THE INVENTION

The invention relates, in an embodiment, to a visibility infrastructure network configured for monitoring a switching network by redirecting packets to monitoring tools, the packets representing packets transmitted by a switching network or packets generated from the packets transmitted by the switching network. There are included a plurality of network infrastructure visibility elements, the plurality of network infrastructure visibility elements including forwarding hardware for forwarding the packets to the monitoring tools. There is also included an abstracted operating system shared by the plurality of network infrastructure visibility elements and operates as a control layer for the plurality of network infrastructure visibility elements. There is further included at least one application executing on the abstracted operating system, the at least one application utilizing a function of one of the plurality of network infrastructure visibility elements. There is additionally included a common logical architecture having a first common protocol for enabling the abstracted operating system to communicate with the at least one application and a second common protocol for enabling the plurality of network infrastructure visibility elements to communicate with the abstracted operating system.

In another embodiment, the invention relates to a method for monitoring a switching network by redirecting packets to monitoring tools, the packets representing packets transmitted by a switching network or packets generated from the packets transmitted by the switching network. The method includes providing a plurality of network infrastructure visibility elements, the plurality of network infrastructure visibility elements including forwarding hardware for forwarding the packets to the monitoring tools. The method also includes providing an abstracted operating system and sharing the abstracted operating system among the plurality of network infrastructure visibility elements, wherein the abstracted operating system operates as a control layer for the plurality of network infrastructure visibility elements. The method additionally includes providing at least one application and executing the at least one application using the abstracted operating system, the at least one application utilizing a function of one of the plurality of network infrastructure visibility elements. The method further includes providing a common logical architecture having a first common protocol for enabling the abstracted operating system to communicate with the at least one application and a second common protocol for enabling the plurality of network infrastructure visibility elements to communicate with the abstracted operating system.

In yet another embodiment, the invention relates to a network infrastructure visibility element configured for monitoring a switching network under control of an application executed on an abstracted operating system, the network infrastructure visibility element redirecting packets to a monitoring tool, the packets representing packets transmitted by a switching network or packets generated from the packets transmitted by the switching network. There is included forwarding hardware for forwarding the packets or copies of the packets to the monitoring tool. The forwarding hardware communicates, using a common protocol, with the abstracted operating system that is disposed in a location geographically remote relative to the forwarding hardware; the operating system being shared by at least one other network infrastructure visibility element via the common protocol. There is additionally included L4-L7 service functions at least for steering the packets to the monitoring tool, wherein the network infrastructure visibility element is utilized by the application that executes on the abstract operating system.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
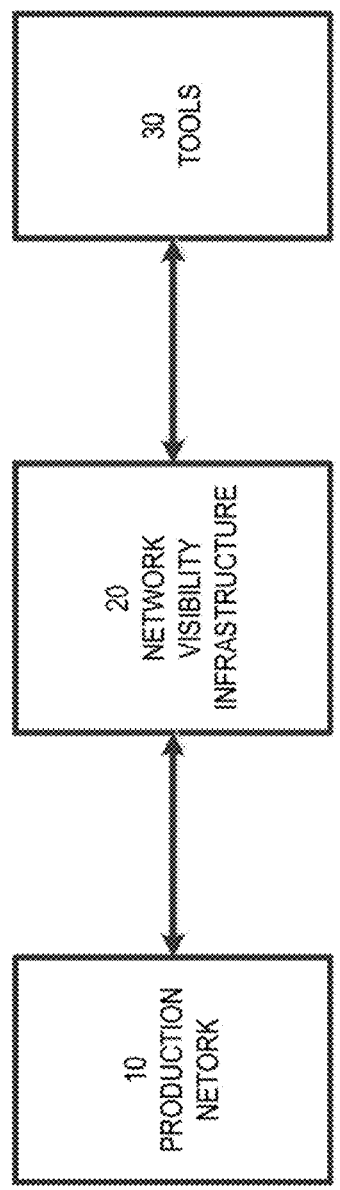
FIG. 1A shows the relationship between the production network, the network visibility infrastructure, and the network monitoring tools.
Figure 1B:
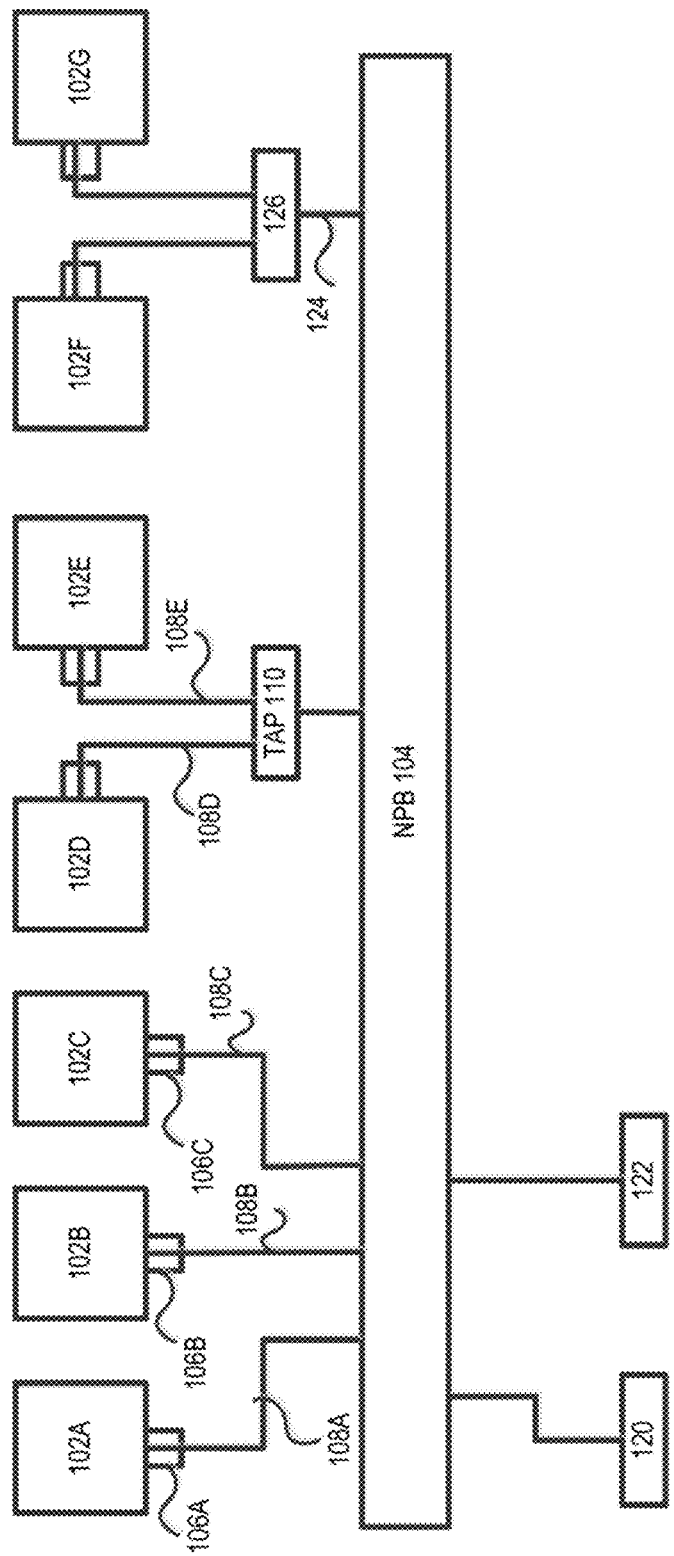
FIG. 1B shows a typical network configuration in which a plurality of network devices (such as routers or switches) are shown communicatively coupled to a NPB to facilitate discussion.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to methods and apparatus for implementing and managing the network visibility infrastructure elements as a network. As the term is employed herein, the network visibility infrastructure elements include the resources that provide original, redirected, or replicated packets to network monitoring tools. In this disclosure, taps, network packet processors and mirroring ports are employed as examples of the network visibility infrastructures although these examples are not limiting. The monitoring tools may include, for example and without limitation, network analysis tools, forensic tools, various network monitoring tools, firewalls, malware prevention tools, intrusion detection tools, etc.

In one or more embodiments, the control plane is decoupled from the forwarding hardware plane of the network visibility infrastructure element such that the control plane may be abstracted. By abstracting the control plane and the application plane from the actual forwarding hardware at each of the network visibility infrastructure elements, it is possible to modularize the architecture such that while the forwarding hardware still resides at each of the network visibility infrastructure elements dispersed throughout the network, the operating system and the applications may be abstracted and remotely located.

Application Programming Interfaces (APIs) and interoperability modules are established between the abstracted operating system and the forwarding hardware such that the forwarding hardware can be readily provisioned on a plug-and-play basis at the network visibility infrastructure elements as long as they comply with the APIs and pre-established logical architecture. Communication between the abstracted operating system and its associated forwarding hardware may follow a standard analogous to, for example, OpenFlow™.

The centralization of the control elements associated with the abstracted operating system, which may be implemented remote from the network visibility resource elements themselves, provides opportunities for more efficient configuration and management of the network visibility resource elements as well as integrated with existing SDNs.

These and other features and advantages of embodiments of the invention may be understood with reference to the figures and discussions that follow.

Figure 2:
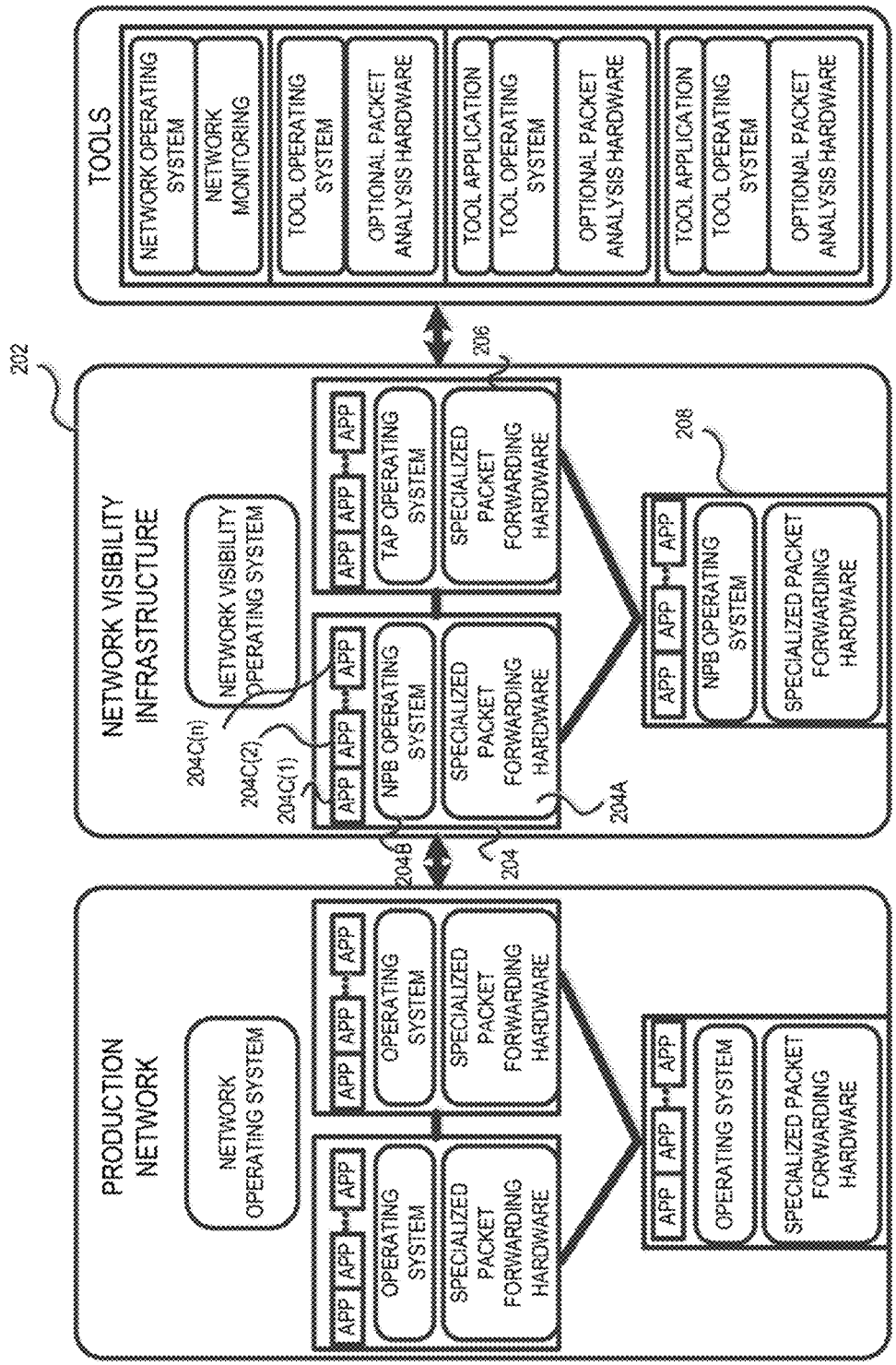
FIG. 2 conceptually shows, for discussion purposes, a typical network visibility infrastructure in greater details.

FIG. 2 conceptually shows, for discussion purposes, a typical network visibility infrastructure in greater detail. The network visibility infrastructure 202 of FIG. 2 comprises 3 example network visibility infrastructure elements: NPB 204, tap 206, and NPB 208. As shown, each of NPB 204, tap 206, and NPB 208 includes specialized packet forwarding hardware. NPB 204 includes for example specialized packet forwarding hardware 204a, which represents the circuitry for forwarding packets onto the monitoring tools for example. NPB 204 also includes an NPB operating system 204b, which is typically disposed in the same chassis employed to house specialize packet forwarding hardware 204a. Applications 204c(1)-204c(n) represent applications executing on NPB OS 204b and may perform functions such as filter setting. Tap 206 and NPB 208 are configured analogously.

In the example of FIG. 2, since the operating system (such as 204b) is implemented locally at the network visibility infrastructure element (such as NPB 204), the control plane and the hardware forwarding plane (including for example the forwarding hardware 204a) are tightly coupled. If changes to the OS are required, these changes need to be made at each operating system 204b of each NPB.

Further, since each of the applications (such as 204c(1)) is implemented locally at the network visibility infrastructure element (such as NPB 204) and executes on the operating system disposed locally, the application plane and the forwarding plane (including for example the forwarding hardware 204a) are also tightly coupled. If changes to the application are required, these changes need to be made to the application program installed in each NPB.

Further, since each network visibility infrastructure element is treated as a stand-alone component in the sense that they are not coordinated with one another, it is difficult to manage the network visibility infrastructure elements as a network. As well, it is difficult to obtain a network-wide view of the network from the independently operating network visibility infrastructure elements. Still further, coordination among the network visibility infrastructure elements for purposes such as load balancing and conflict resolution between network requirements and tool capabilities are cumbersome and difficult, if not impossible.

Figure 3:
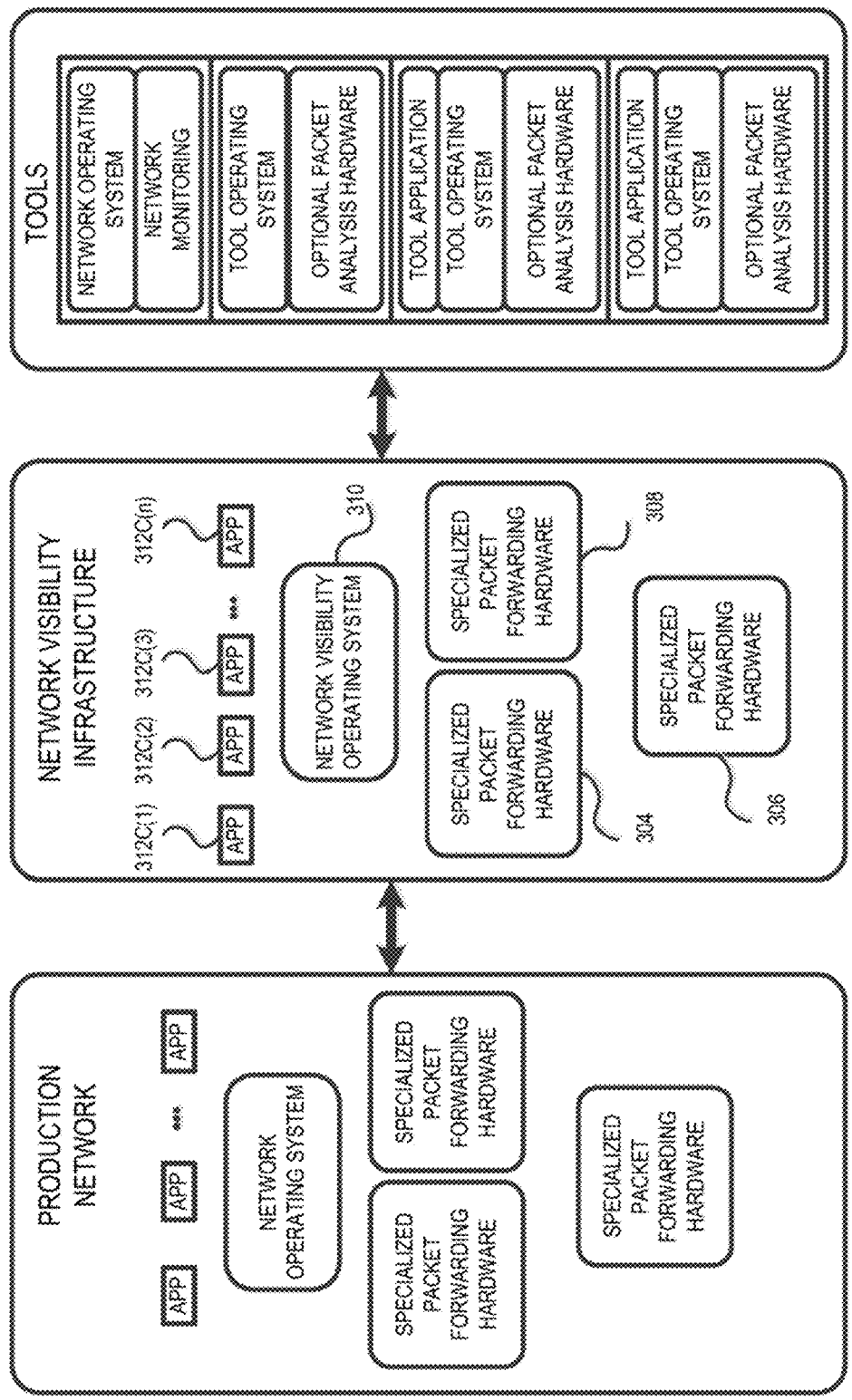
FIG. 3 shows, in accordance with an embodiment of the invention, the improved network visibility infrastructure wherein the control and application planes are decoupled from the forwarding hardware at the network visibility infrastructure element and abstracted as centralized software to simplify provisioning, configuration, and management of the network visibility infrastructure.

FIG. 3 shows, in accordance with an embodiment of the invention, the improved network visibility infrastructure wherein the control and application planes are decoupled from the forwarding hardware at the network visibility infrastructure element and abstracted as centralized software to simplify provisioning, configuration, and management of the network visibility infrastructure. As shown in FIG. 3, network visibility infrastructure 302 also includes three example network visibility infrastructure elements 304, 306, and 308. Network visibility infrastructure elements 304, 306, and 308 may represent any combination of taps and/or network packet brokers and/or mirroring ports (e.g., SPAN ports).

In contrast to the arrangement of FIG. 2, the operating system (i.e., control plane) of the network visibility infrastructure elements has been abstracted from the network visibility infrastructure elements and implemented as a software-implemented network operating system 310 (such as on an actual or virtual server). Applications, such as 312c(1)-312c(n), execute on this software-implemented network operating system 310 and thus do not need to be executing at each network visibility infrastructure element.

The abstracted network visibility infrastructure operating system 310 communicates with each of the network visibility infrastructure elements using pre-defined APIs (Application Programming Interface) such that any forwarding hardware complying to the API can be employed for network visibility purposes. In this manner, the network visibility infrastructure elements can be provisioned on a plug-and-play basis at any location on the network and configuration and/or maintenance of these network visibility infrastructure elements may be performed at a central location via applications executing on the abstracted network visibility infrastructure operating system.

It should be understood that it is not absolutely required that all operating system functionalities of the network visibility infrastructure elements be abstracted. In one or more embodiments, the network visibility infrastructure operating system may implement some operating system functionalities, and software and/or firmware local to the network visibility infrastructure elements may implement other operating system functionalities. Preferably, the network visibility infrastructure operating system implements functionalities that can benefit from centralization (such as for example and without limitation custom parameter settings for the network visibility infrastructure elements and/or the tools) while software and/or firmware local to the network visibility infrastructure elements may implement other operating system functionalities that would be more beneficially implemented locally (e.g., to reduce demand on network bandwidth and to facilitate fast provisioning). The exact allocation of operating system functionalities between local software/firmware and network visibility infrastructure operating system can vary as desired.

In one or more embodiments, the communication to/from the forwarding hardware and/or the network visibility infrastructure operating system in the control plane is accomplished by implementing a common logical architecture for the network visibility functions (including for example all or some of the functions to provision, to configure, to communication with and/or to maintain the network visibility infrastructure and/or the network monitoring tools). For actual communication between the controlling function (e.g., the aforementioned abstracted network visibility infrastructure operating system) and the forwarding hardware, APIs and protocols may be predefined in advance. In this manner, any forwarding hardware communicating using the common logical architecture and API/protocol may communicate with the abstracted network visibility infrastructure operating system and vice versa.

In an embodiment, the inventor herein realizes that although the OpenFlow™ standard for software defined networks (See OpenFlow Switch Specification, published by the Open Networking Foundation (ONF) https://www.opennetworking.org) does not contemplate the visibility infrastructure as a network, the visibility infrastructure could benefit from being configured and managed as a network that co-exists with the OpenFlow™ managed switching network. To this end, the OpenFlow™ protocol and logical architecture are augmented to also be employed to configure and manage the visibility infrastructures (i.e., the taps, NPBs, and mirroring ports) that have heretofore been regarded as stand-alone devices by OpenFlow™.

In one or more embodiments, extensions are made to the logical architecture of OpenFlow™ and the OpenFlow™ specification is augmented with APIs and logical models for communicating with the modular forwarding hardware of the network visibility infrastructure elements and with the abstracted control plane of the network visibility infrastructure. In this manner, OpenFlow™ can be used to configure and manage both the switching network and the network visibility infrastructure.

For example, there are APIs that exist in OpenFlow™ that can be used as is at network visibility infrastructure such as packet redirecting to a destination port. There are also OpenFlow™ functionalities such as redirecting packets to a LAG (link aggregation port) that can be used at the network visibility infrastructure device as a load balancing group. There are APIs that need to be added to OpenFlow™ such as strict load balancing group where traffic distribution is consistent upon link failure.

Figure 4:
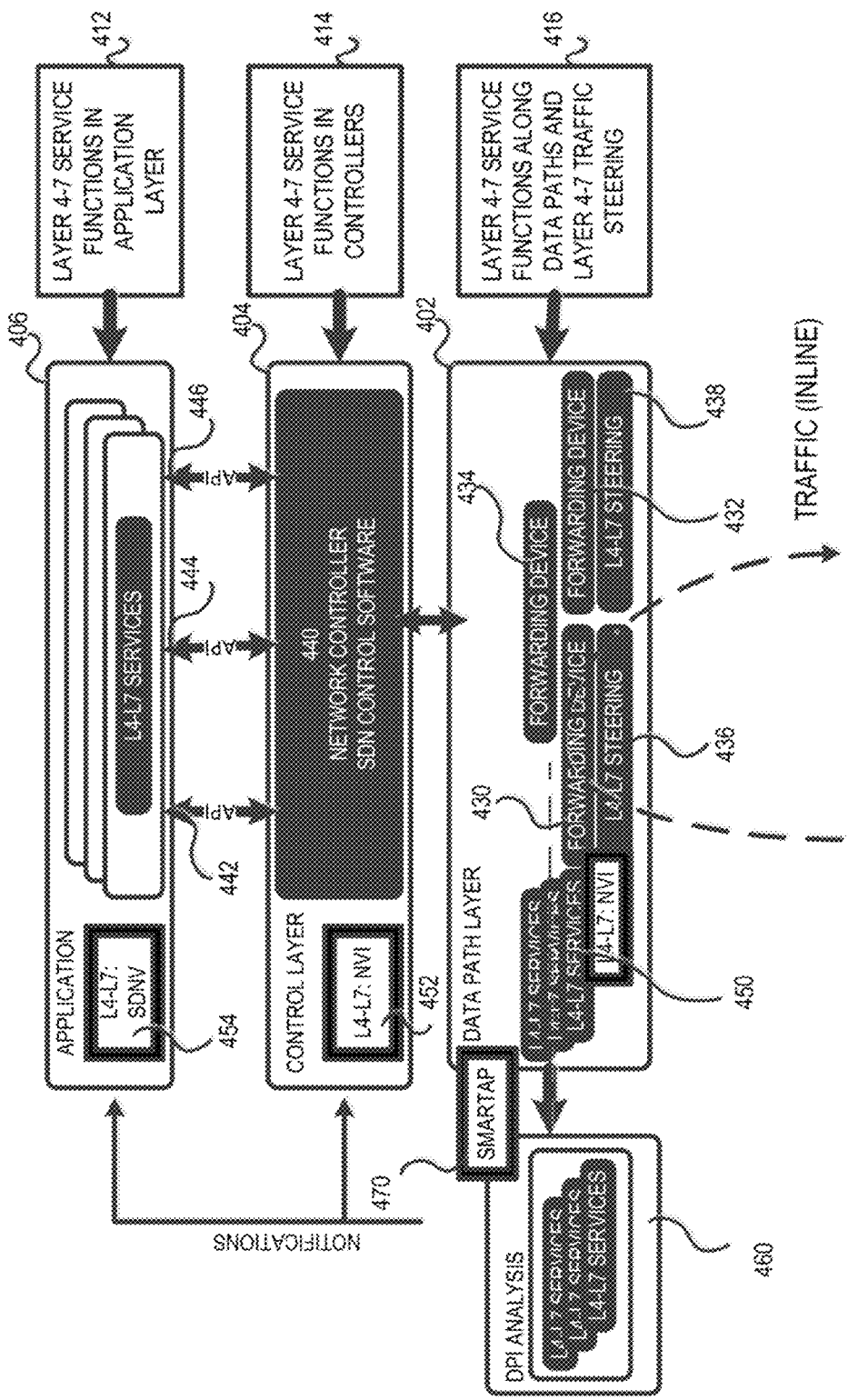
FIG. 4 shows, in accordance with an embodiment of the invention, a conceptual view of the logical architecture of the network visibility infrastructure when managed as a network.

FIG. 4 shows, in accordance with an embodiment of the invention, a conceptual view of the logical architecture of the network visibility infrastructure when managed as a network. Conceptually speaking, there are three layers: data path layer 402, control layer 404, and application layer 406. These layers mirror the conceptual architecture of software defined networks implementing OpenFlow™ for switching networks. Layer 4-Layer 7 (L4-7) services functions are implemented in all 3 layers (412, 414, and 416). Forwarding hardware modules 430, 432, and 434 are also shown, along with associated L4-7 steering modules 436 and 438.

Additionally, there is implemented a network controller/SDN control software 440, which implements the control layer Operating System and the aforementioned logical architecture and APIs necessary to allow the control layer Operating System to be abstracted from the data path forwarding hardware and to facilitate communication between the control layer Operating System and the data path forwarding hardware over network links. Through established APIs (442, 444, and 446), applications providing L4-L7 service functions at the application layer 406 may be executed on the abstracted Operating System of control layer 404.

Further, there are implemented Data Path Layer Interoperability module 450 and Control Layer Interoperability module 452, representing modules for communicating with the tools (shown in FIG. 4 by representative Deep Packet Analysis 460). In one or more embodiments, these modules permit direct configuration of the network visibility infrastructure. Network visibility resources (such as taps, mirroring ports, and NPBs) may be pre-allocated to the monitoring tools if desired. As well, the tools may manage their resources directly without involvement of the applications at the application layer 406 and 454 (SDNV). For example, filter configuration, bandwidth management, the management and configuration of tunnels, packet attributes, threshold crossing alerts as well as other alerts, may be managed without involvement of the applications at the application layer 406 and 454 (SDNV). To elaborate, although SDNV is a central management of the network visibility infrastructure it is highly desired to allow a fast configuration and a dedicated resources to the tools. For example an intrusion detection tool can quickly react to a suspicious traffic and configured the NPB to redirect a specific traffic, the dedicated resource is the TCAM i.e. reserved classification entries at the NPB. This feature is possible by using the NVI 450.

There is further an Application Layer Interoperability Module 454 for facilitating communication from the monitoring tools and the production network controller to the network visibility infrastructure. In this manner, network visibility applications can directly communicate with the tools and the production network controller and configure and/or manage the network visibility infrastructure as a network. Examples (not exhaustive or limiting) of such applications include filter abstraction management, network visibility SLA (Service Level Agreement) control, SmartTap™ management such as managing and configuration of tunnel, packet attributes, threshold crossing alerts as well as other alerts, etc. As is known, SmartTap™ (470) provides the ability to control which attributes to filter and the exact tunneling, along with simple configuration/management thereof. Further details pertaining to the SmartTap™ product may be obtained from Ixia of Calabasas, Calif.

An example advantage of having a network view or of managing the network visibility infrastructure (pertaining to the network monitoring/management function) as a network alongside the software defined network (pertaining to the switching function) is the ability to resolve conflicts between tool requirements and network requirements. For example, if the network bandwidth management SLA calls for a particular SLA requirement, and this network bandwidth SLA requirement conflicts with the tool's specification (such as bandwidth capability of the tool), a network view of the tools and the network would enable applications in the application layer to detect such discrepancy, to configure the tools to adapt (such as load balancing or additional visibility resource provisioning) to the network bandwidth SLA requirement, or to raise alerts with the network operator. This is particularly true if both the software defined network and the network visibility infrastructure follow or are based upon the OpenFlow™ standard.

As can be appreciated from the foregoing, embodiments of the invention define and implement a network visibility infrastructure that can be configured and managed as a network based on the open network concept and the OpenFlow™ standard. With this approach, both the switching network and the network visibility infrastructure can be managed as networks and more importantly, can be managed together to consolidate network and tool requirements/capabilities to provide greater insight into network operation as well as flexibility and efficiency as far as detecting conflicts, configuration and management of the network visibility infrastructure elements as well as configuration and management of the monitoring tools.

Furthermore, one or more embodiments of the invention decouple the control and forwarding functions of the network visibility infrastructure elements (such as taps and NPBs) to allow abstraction of the control layer. One or more embodiments of the invention enable network visibility control to be directly programmable and the underlying infrastructure to be abstracted for network visibility services. By adopting the software defined network concept and the OpenFlow™ standard, albeit slightly modified to handle the network visibility infrastructures and requirements/capabilities thereof, one or more embodiments promote a unified management capability that integrates both networks. In one or more embodiments, network control (network traffic SLA for inline packets, for example) can be directly programmable. Further, tool traffic SLA and packets attributes associated with network monitoring tools and security systems can be directly programmable.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A visibility infrastructure network configured for monitoring a switching network by directing copies of packets traversing said switching network to monitoring tools performing functions separate from packet switching performed by said switching network, said visibility infrastructure network comprising:

a plurality of network infrastructure visibility elements, said plurality of network infrastructure visibility elements including forwarding hardware for forwarding said copies of said packets traversing said switching network to said monitoring tools for performing said functions separate from said packet switching performed by said switching network, said plurality of network visibility elements including at least one tap and at least one network packet broker, separate from switching devices that perform said packet switching in said switching network, for forwarding said copies of said packets to said monitoring tools;

an abstracted operating system shared by said plurality of network infrastructure visibility elements and operates as a control layer for said plurality of network infrastructure visibility elements;

at least one application executing on said abstracted operating system, said at least one application utilizing a function of one of said plurality of network infrastructure visibility elements; and a common logical architecture having a first common protocol for enabling said abstracted operating system to communicate with said at least one application and a second common protocol for enabling said plurality of network infrastructure visibility elements to communicate with said abstracted operating system, wherein said common logical architecture utilizes OpenFlow™ to configure and manage said at least one network tap and said at least one network packet broker.

2. The visibility infrastructure network of claim 1 wherein said plurality of network infrastructure visibility elements includes at least one mirroring port of a switching device employed by said switching network.

3. The visibility infrastructure network of claim 1 wherein the common logical architecture represents an extended version of OpenFlow™.

4. The visibility infrastructure network of claim 1 wherein said abstracted operating system implements layer 4-layer 7 (L4-L7) service functions in a control layer of said common logical architecture.

5. The visibility infrastructure network of claim 4 further comprising a plurality of applications executing in an application layer of said common logical architecture, said plurality of applications implements said L4-L7 service functions in said application layer, said L4-L7 service functions in said application layer communicate with said L4-L7 service functions in said control layer via said first common protocol.

6. The visibility infrastructure network of claim 4 wherein said plurality of network infrastructure visibility elements implements said L4-L7 service functions in a data path layer of said common logical architecture, said L4-L7 service functions in said data path layer communicate with said L4-L7 service functions in said control layer via said second common protocol.

7. The visibility infrastructure network of claim 1 further comprising an application layer interoperability module implemented by a processor for enabling said at least one application to communicate directly with said monitoring tools.

8. The visibility infrastructure network of claim 1 wherein said monitoring tools include at least one of a network analysis tool, forensic tool, firewall, malware prevention tool, and intrusion detection tools.

9. A method for monitoring a switching network by directing copies of packets traversing said switching network to monitoring tools performing functions separate from packet switching performed by said switching network, said method comprising:
 providing a plurality of network infrastructure visibility elements, said plurality of network infrastructure visibility elements including forwarding hardware for forwarding said copies of said packets to said monitoring tools performing said functions separate from said packet switching performed by said switching network, said plurality of network visibility elements including at least one tap and at least one network packet broker, separate from switching devices that perform said packet switching in said switching network, for forwarding said copies of said packets to said monitoring tools;
 providing an abstracted operating system;
 sharing said abstracted operating system among said plurality of network infrastructure visibility elements, wherein said abstracted operating system operates as a control layer for said plurality of network infrastructure visibility elements;
 providing at least one application;
 executing said at least one application using said abstracted operating system, said at least one application utilizing a function of one of said plurality of network infrastructure visibility elements; and
 providing a common logical architecture having a first common protocol for enabling said abstracted operating system to communicate with said at least one application and a second common protocol for enabling said plurality of network infrastructure visibility elements to communicate with said abstracted operating system, wherein said common logical architecture utilizes OpenFlow™ to configure and manage said at least one network tap and said at least one network packet broker.

10. The method of claim 9 wherein said plurality of network infrastructure visibility elements includes at least one mirroring port of a switching device employed by said switching network.

11. The method of claim 9 wherein the common logical architecture represents an extended version of OpenFlow™.

12. The method of claim 9 wherein said abstracted operating system implements layer 4-layer 7 (L4-L7) service functions in said control layer of said common logical architecture.

13. The method of claim 12 further comprising providing a plurality of applications that executes using said abstracted operating system, said plurality of applications implements said L4-L7 service functions in said application layer, said L4-L7 service functions in said application layer communicate with said L4-L7 service functions in said control layer via said first common protocol.

14. A network infrastructure visibility element configured for monitoring a switching network under control of an application executed on an abstracted operating system, said network infrastructure visibility element directing copies of packets traversing said switching network to a monitoring tool performing a function separate from packet switching performed by said switching network, the network infrastructure visibility element comprising:
 forwarding hardware for forwarding said copies of said packets traversing said switching network to said monitoring tool performing said function separate from said packet switching performed by said packet switching network, said plurality of network visibility elements including at least one tap and at least one network packet broker, separate from switching devices that perform said packet switching in said switching network, for forwarding said copies of said packets to said monitoring tools;
 said forwarding hardware for communicating, using a common protocol, with said abstracted operating system; said abstracted operating system being shared by at least one other network infrastructure visibility element via said common protocol; and
 L4-L7 service functions at least for steering said packets to said monitoring tool, wherein said network infrastructure visibility element is utilized by said application that executes on said abstracted operating system, wherein said common logical architecture utilizes OpenFlow™ to configure and manage said at least one network tap and said at least one network packet broker.

15. The network infrastructure visibility element of claim 14 wherein said network infrastructure visibility element implements forwarding functions of a tap.

16. The network infrastructure visibility element of claim 14 wherein said network infrastructure visibility element implements forwarding functions of a network packet broker.

* * * * *